United States Patent
Syed et al.

(10) Patent No.: US 10,305,583 B2
(45) Date of Patent: May 28, 2019

(54) WIRELESS MEDIA USAGE, CHANNEL AGGREGATION, AND FULL-DUPLEX COMMUNICATIONS

(71) Applicant: Time Warner Cable Enterprises LLC, St. Louis, MO (US)

(72) Inventors: Hussain Zaheer Syed, Ashburn, VA (US); Muhib Taiye Oduwaiye, Germantown, MD (US); Sunmeel Meelind Bhumkar, Rockville, MD (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 6 days.

(21) Appl. No.: 15/790,622

(22) Filed: Oct. 23, 2017

(65) Prior Publication Data
US 2018/0048383 A1   Feb. 15, 2018

Related U.S. Application Data

(62) Division of application No. 14/574,498, filed on Dec. 18, 2014, now Pat. No. 9,813,148.

(51) Int. Cl.
*H04W 4/00* (2018.01)
*H04B 7/212* (2006.01)
(Continued)

(52) U.S. Cl.
CPC .......... *H04B 7/212* (2013.01); *H04W 72/042* (2013.01); *H04W 72/02* (2013.01); *H04W 72/0413* (2013.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2005/0078637 A1* | 4/2005 | Rajkotia | ............... | H04W 88/06 370/335 |
| 2007/0237125 A1* | 10/2007 | Ohuchi | ................. | H04W 16/04 370/338 |

(Continued)

OTHER PUBLICATIONS

Dinesh Bharadia, et al., Standford University, "Full Duplex MMO Radios," Article, pp. 1-13, retrieved from www.stanford.edu website, unspecified publication date.

*Primary Examiner* — Zewdu A Beyen
(74) *Attorney, Agent, or Firm* — Armis IP Law, LLC

(57) ABSTRACT

A wireless network includes a channel allocation manager and multiple wireless access points. The wireless channel allocation manager receives a request from a first wireless access point amongst multiple wireless access points for allocation of a wireless channel. In response to receiving the request for allocation of a wireless channel, the channel allocation manager selects a particular wireless channel for allocation to the first wireless access point in the network environment. The channel allocation manager notifies the multiple wireless access points of a particular wireless channel that has been allocated for use by the first wireless access point (or its subordinates) in a specified timeframe. The first wireless access point either uses the allocated channel to communicate data downstream to a respective mobile communication device or notifies the mobile communication device that the particular wireless channel has been allocated to communicate upstream to the first wireless access point.

18 Claims, 10 Drawing Sheets

(51) Int. Cl.
*H04W 72/04* (2009.01)
*H04W 74/08* (2009.01)
*H04W 72/02* (2009.01)

(56) References Cited

U.S. PATENT DOCUMENTS

| | | |
|---|---|---|
| 2010/0124209 A1 | 5/2010 | In |
| 2012/0213204 A1 | 8/2012 | Noh |
| 2013/0077554 A1* | 3/2013 | Gauvreau ............... H04L 5/001 370/312 |
| 2013/0201884 A1 | 8/2013 | Freda |
| 2013/0272227 A1 | 10/2013 | Gallagher |
| 2014/0029585 A1 | 1/2014 | Freda |
| 2015/0223069 A1* | 8/2015 | Solondz ............... H04W 12/08 370/329 |
| 2015/0271834 A1* | 9/2015 | Ma ...................... H04W 72/085 370/329 |

* cited by examiner

WIRELESS MEDIA USAGE, CHANNEL AGGREGATION, AND FULL-DUPLEX COMMUNICATIONS

RELATED APPLICATIONS

This application is a divisional application of earlier filed U.S. patent application Ser. No. 14/574,498 entitled "WIRELESS MEDIA USAGE, CHANNEL AGGREGATION, AND FULL-DUPLEX COMMUNICATIONS," filed on Dec. 18, 2014, the entire teachings of which are incorporated herein by this reference.

BACKGROUND

Conventional wireless networks typically include multiple communication resources (such as one or more WiFi™ base stations or wireless access points) providing wireless communications to one or more mobile communication devices. For example, a conventional wireless network may include: a first wireless access point providing wireless coverage to a first region in a network environment; a second wireless access point providing wireless coverage to a second region in the network environment; and so on.

Each of one or more wireless base stations may be part of a same wireless network providing access to a corresponding remote network such as the Internet. Via communications through a selected one of the multiple wireless access points, a respective user of the mobile communication device is able to wirelessly communicate through a wireless access point over the Internet.

In accordance with the WiFi™ protocol, the end-users (i.e., client mobile devices) in a wireless network environment compete amongst each other to use available wireless channels using CSMA/CA (Carrier Sends Multiple Access/ Collision Avoidance) techniques.

As a specific example, prior to transmitting data on a respective wireless channel in a network environment, in accordance with CSMA, the device attempting to transmit data monitors a respective wireless channel for transmissions by other communication devices. If the monitored channel is reasonably clear (such as during which little or no communications are transmitted on the channel), the device transmits its data over the available channel to a target recipient such as a wireless access point. On the other hand, if the channel is not clear because one or more other communication resources are communicating over the channel, the device schedules attempted communications at a later time in accordance with a random back off timer value. At expiration of the random back off timer value, the device attempting to communicate on the monitored channel checks again to see if the monitored wireless channel is clear. If so, the device transmits over the channel. Thus, eventually, in theory, the device will be able to transmit its data in a CSMA acquired channel after detecting that the channel is clear.

BRIEF DESCRIPTION OF EMBODIMENTS

Conventional techniques of providing wireless access to competing communication devices suffer from deficiencies. For example, transmission of communications in accordance with the WiFi™ protocol are prone to congestion when a respective wireless network is heavily used by many end-users (e.g., client devices). In other words, because there is only a limited wireless spectrum available for transmitting communications, ever-increasing demand to transmit data eventually results in the inability of the users to transmit data at a respective desired rate. In accordance with the WiFi™ protocol as mentioned above, a respective station implements CSMA to acquire a wireless channel. As more and more users compete to use wireless resources, a device attempting to transmit data has a more difficult time trying to obtain a respective wireless channel. As indicated above, if a respective channel is continuously used because there are so many users, the device attempting to transmit the data may experience undesirable communication delays.

Embodiments herein deviate with respect to conventional techniques to provide better use of an available wireless spectrum.

More specifically, in accordance with one example embodiment, a wireless network includes multiple available wireless channels. Stations (i.e., communication resources such as wireless access points, mobile communication devices, etc.) compete for use of the wireless channels at the physical radio frequency layer. Assume that a first wireless channel is used to communicate first data between a first station and a second station. Further assume that that the first station acquires the first wireless channel to communicate with the second station in accordance with a CSMA (Carrier Sense Multiple Access) communication protocol. As previously discussed, use of a communication protocol such as CSMA/CA (Carrier Sense Multiple Access/Collision Avoidance) enables the stations to compete at the physical radio frequency layer for channels.

In addition to, or in lieu of using CSMA/CA techniques to obtain radio frequency channels in a short-range wireless network environment such as WiFi™, embodiments herein can include wireless channel allocation in one or more timeframes. More specifically, according to further embodiments herein, assume that a first station is in communication with a channel allocation manager that oversees allocation of wireless channels to the stations in accordance with a TDMA-type (Time Division Multiple Access) communication protocol in which channels are allocated for pre-specified amounts of time. Via communications at a layer such as at a MAC (Media Access Control) communication layer, which is as a higher network layer than the physical radio frequency layer, the first station is able to compete for (request) use of channels in a non-CSMA/CA manner.

In response to receiving a request from the first station (which may be made on behalf of the second station for itself) for allocation of a radio frequency channel in one or more timeframes, the channel allocation manager generates and transmits an allocation notification to the first station. The first station receives an allocation notification from the channel allocation manager. In one embodiment, the allocation notification indicates that a second wireless channel has been allocated to support communications between the first station and the second station in a specified future one or more timeframes.

Allocation of the wireless channel for use in the specified timeframe is useful in instances such as when a station (such as a mobile communication device) has an excessive amount of data to transmit to a target recipient. For example, if the second station is the station that has the excessive amount of data to transmit to the first station, the second station can be configured to communicate a request for the additional bandwidth to the first station. As previously discussed, the first station forwards the request to the channel allocation manager (such as at a remote location) to be granted use of one or more additional wireless channels in one more pre-specified time frames.

In accordance with yet further embodiments, the first station and second station can be configured to support full-duplex communications. For example, the second station can be configured to use a first wireless channel to transmit data in the upstream direction from the second station to the first station while the first station communicates data on a second wireless channel in a downstream direction from the first station to the second station. In one embodiment, the second wireless channel (a TDMA type channel) is acquired via non-CSMA techniques. The first channel is acquired via CSMA techniques.

In addition to supporting full-duplex communications, further embodiments herein support channel aggregation. For example, the second station can be configured to implement CSMA/CA techniques to acquire one or more channels for transmission of data from the second station in an upstream direction to the first station. As previously discussed, the second station can communicate with the first station for allocation of additional wireless bandwidth to transmit data in the upstream direction to the first station. In such an instance, as previously discussed, the second station can receive control information from the first station indicating that a particular wireless channel has been allocated for use by the mobile communication device in a corresponding timeframe. In addition to transmitting data in an upstream direction from the second station to the first station over a CSMA acquired wireless channel, the second station can be configured to additionally and simultaneously (or not simultaneously) transmit portions of data traffic in the upstream direction from the second station to the first station on the allocated wireless channel during the pre-specified timeframe.

In this manner, the channels can be aggregated. In other words, the second station can be configured to simultaneously communicate data in an upstream to the first station over the CSMA-acquired channel as well as over the one or more controller-allocated channels allocated by the channel allocation manager in specified one more time frames.

Accordingly, one or more stations in the wireless network environment can be configured to use CSMA acquired wireless channels in accordance with conventional techniques to communicate data. As further described herein, a channel allocation manager can be configured to allocate, on as needed basis, as an alternative to requiring that wireless channels always be acquired using CSMA, use of one or more channels in specified time frames. Since the channel allocation manager schedules use of one or more channels in specified time frames, and potentially notifies each of the communication resources in the network environment that the channels have been allocated, there is no need for the station using the allocated channel in the specified one more timeframes to implement CSMA/CA to use such allocated wireless channels because the other stations (that have not been allocated the particular channel) are aware that they are not to transmit over the allocated channel in the pre-specified timeframes, avoiding communication collisions/wireless interference. This results in more efficient use of the available wireless spectrum. It also supports short-term allocation of channels to communication are devices that require to transmit short-term bursts of data.

These and other more specific embodiments are disclosed in more detail below.

Note that any of the resources as discussed herein can include one or more computerized devices, controllers, set top boxes, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. In accordance with one embodiment, the instructions, when executed by computer processor hardware, cause the computer processor hardware (such as in a wireless access point) to: utilize a first wireless channel to communicate first data between a first station and a second station, the first wireless channel acquired in accordance with a CSMA (Carrier Sense Multiple Access) communication protocol; receive notification that a second wireless channel has been allocated to support communications between the first station and the second station in a specified timeframe; and in accordance with the notification, utilize the second wireless channel in the specified timeframe to communicate second data between the first station and the second station.

Another embodiment herein includes a computer readable storage medium and/or system having instructions stored thereon. The instructions, when executed by computer processor hardware, cause the computer processor hardware (such as in a mobile communication device) to: receive a request from a first wireless access point for allocation of a wireless channel in a network environment, the first wireless access point being one of multiple wireless access points in a wireless network sharing use of available wireless channels; select a particular wireless channel for allocation to the first wireless access point in the network environment; and notify the multiple wireless access points that the particular wireless channel has been allocated for use by the first wireless access point in a pre-specified timeframe.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As further discussed herein, techniques herein are well suited to provide enhanced data communications such as in a WiFi™ or other suitable type of network. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
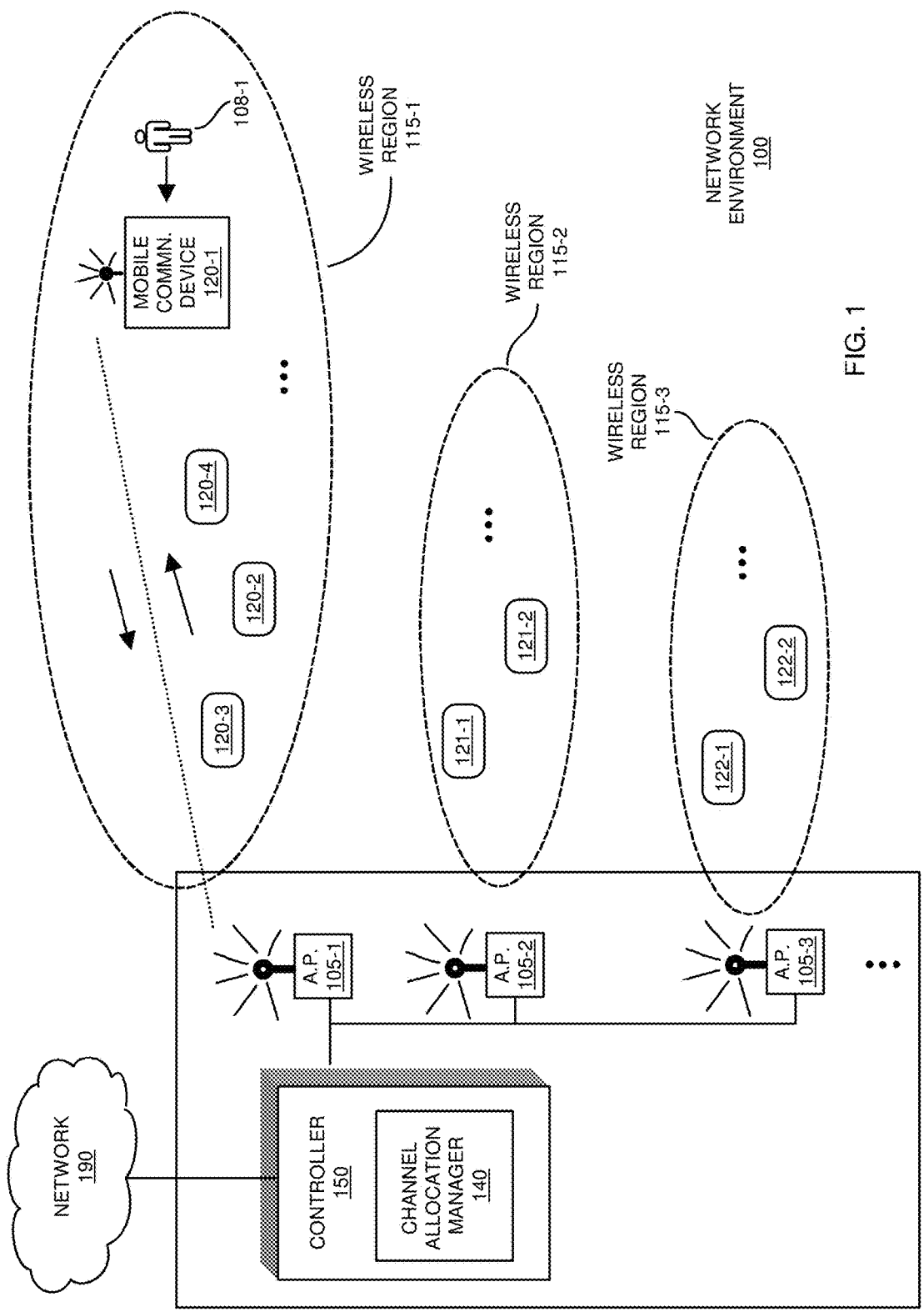
FIG. 1 is an example diagram illustrating a network environment and corresponding channel request and acquisition according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

According to one embodiment, in response to receiving a request for a wireless channel, a wireless access point communicates with a channel allocation manager that monitors, controls, and schedules usage of the wireless channels in the wireless network. While communicating with the channel allocation manager, the wireless access point requests allocation of wireless bandwidth on behalf of itself or a corresponding mobile communication device.

Prior to receiving the request for the wireless channel, the channel allocation manager monitors usage of wireless resources in the wireless network. Based on a prediction of future channel usage based on past channel usage, the channel allocation manager allocates one or more wireless channels for use by the mobile communication device to transmit data in respective one or more pre-specified timeframes. In one embodiment, the channel allocation manager notifies each of one or more of the multiple wireless access points (including the wireless access point requesting allocation of the wireless bandwidth on behalf of the mobile communication device) in the network environment that the one or more wireless channels have been allocated for use by the wireless access point (or corresponding mobile communication device) in the future specified one or more timeframes.

The wireless access point receiving notification of the allocation further notifies the mobile communication device that the one or more wireless channels have been allocated for use by the mobile communication device in a corresponding one or more timeframes. During the corresponding one or more timeframes, the mobile communication device utilizes the allocated one or more wireless channels (and possibly one or more other CMSA-required wireless channels) to communicate data upstream from the mobile communication device to the wireless access point.

In a similar manner, the wireless access point can acquire one or more wireless channels to communicate in a downstream direction to a respective mobile communication device.

Now, more specifically, FIG. 1 is an example diagram illustrating a network environment implementing wireless channel allocation according to embodiments herein.

As shown, network environment 100 includes one or more wireless access points including wireless access point 105-1, wireless access point 105-2, wireless access point 105-3, and so on. Each of the wireless access points 105 can be communicatively coupled to network 190 through controller 150.

The one or more wireless access points in network environment 100 provide one or more users operating respective mobile communication devices access to network 190 (which may include the Internet as well as any other number of networks).

For example, wireless access point 105-1 provides mobile communication devices 120 (mobile communication device 120-1, mobile communication device 120-2, mobile communication device 120-3, mobile communication device 120-4, . . . ) in wireless region 115-1 access to network 190.

Wireless access point 105-2 provides mobile communication devices 121 (mobile communication device 121-1, mobile communication device 121-2, . . . ) in wireless region 115-2 access to network 190.

Wireless access point 105-3 provides mobile communication devices 122 (mobile communication device 122-1, mobile communication device 122-2, . . . ) in wireless region 115-3 access to network 190.

Network environment 100 also includes controller 150. As its name suggests, controller 150 overseas control of the wireless access points 105 and controls conveyance of communications between network 190 and respective wireless access points 105.

Further in this example embodiment, the controller 150 executes channel allocation manager 140. As its name suggests, and as previously discussed, the channel allocation manager 140 allocates use of one or more wireless channels to communication resources (such as wireless access points 105, mobile communication devices, . . . ) for conveyance of data in network environment 100 during one or more specified time frames.

In one embodiment, at least a portion of the available wireless spectrum (such as around the carrier frequency 2.4 GHz, carrier frequency 5 GHz, etc.) in network environment 100 is partitioned to include multiple wireless channels dedicated for upstream data transmissions from a respective mobile communication device to a wireless access point. Additionally, in one embodiment, at least a portion of the available wireless spectrum in network environment 100 is partitioned to include multiple wireless channels dedicated for conveying downstream data transmissions from a respective wireless access point to a target mobile communication device. As further discussed below, channel allocation manager 140 schedules use of a pool of wireless channels for use in pre-specified time frames.

Note that in accordance with an alternative embodiment, each of one or more of the wireless channels can be used to support upstream, downstream, or both upstream/downstream communications.

Further by way of non-limiting example embodiment, each of the wireless channels can be any suitable bandwidth such as 20 MHz wide, as an alternative to the conventional 40 MHz width of standard WiFi™ channels.

If desired, each of the communication resources in network environment 100 transmits over CSMA-acquired wireless channels and controller-allocated wireless channels in accordance with OFDMA (Orthogonal Frequency-Division Multiple Access) in which multiple access is achieved by assigning subsets of subcarriers to individual users. This allows simultaneous data rate transmission from several users.

In one embodiment, the one or more wireless channels used to support wireless communications between wireless access points and respective mobile communication devices in network environment 100 support communications in accordance with a WiFi™ protocol.

As further discussed herein, any of the communication resources in network environment 100 can acquire use of one or more wireless channels in a pool of CSMA channels in accordance with CSMA techniques, independent of communicating with the channel allocation manager 140. For example, as previously discussed, a station attempting to transmit respective data to a target station can be configured to monitor current communications on a respective wireless channel dedicated for CSMA type communications. When the channel is detected as being clear, the station utilizes the clear channel to communicate with a target recipient.

Additionally, as an alternative to requiring a respective one or more wireless channels via CSMA techniques, any of one or more of the communication resources in network environment 100 can be configured to communicate with the channel allocation manager 140 for allocation of one or more additional wireless channels that are then used on a scheduled usage basis. As further discussed below, the one or more non-CSMA acquired channels provide a respective station appropriate wireless bandwidth (such as one or more upstream and/or downstream channels) to communicate to a target recipient in one or more pre-specified time frames.

Figure 2:
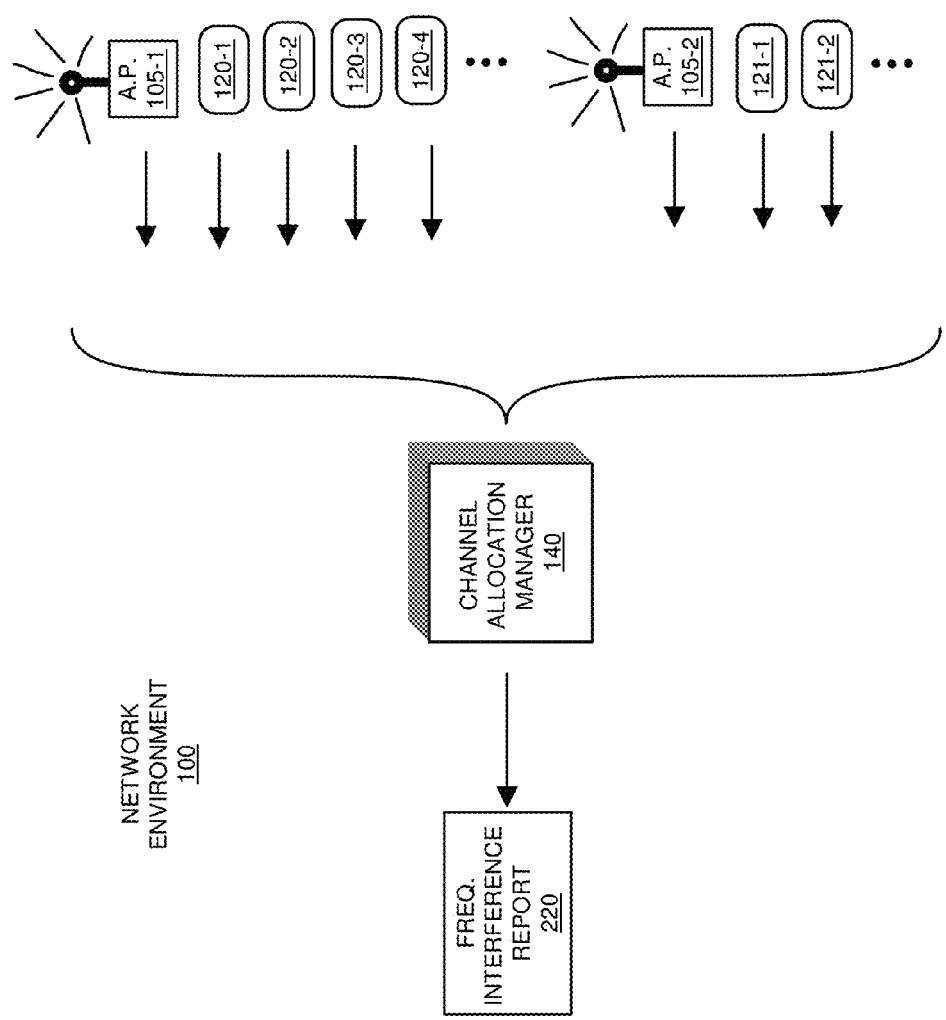
FIG. 2 is an example embodiment illustrating collection of information from multiple resources and generation of frequency interference and usage report information according to embodiments herein.

FIG. 2 is an example diagram illustrating monitoring of network environment and generation of a report according to embodiments herein.

As shown, the channel allocation manager 140 repeatedly receives feedback messages from any of one or more of the communication resources in network environment 100. For example, each of the wireless access points 105 and/or mobile communication devices can be configured to scan the network environment 100 for wireless channel utilization, interference levels on each of the wireless channels by other communication devices, signal strength information indicating received signal strength of signals transmitted by other communication devices on each of the wireless channels, etc. The wireless access points forwards the collected information (indicating usage of the different wireless channels at different locations in network environment 100) to the channel allocation manager 140.

The channel allocation manager 140 utilizes the received frequency interference/signal strength/channel usage, etc., information to produce frequency interference report 220. The report 220 can indicate use of the different wireless channels in the different geographical regions.

In one embodiment, the channel allocation manager 140 continuously and/or receives wireless channel frequency interference and usage information from the one or more communication resources in network environment 100. Using the continuously received wireless channel usage and interference information received from the communication resources in network environment 100, the channel allocation manager 140 periodically updates the frequency interference report 220 so that it is constantly fresh and represents a snapshot of the wireless channels and their ability to be used to communicate data.

In one embodiment, the channel allocation manager 140 forwards the report 220 to any of one or more of the communication resources (wireless access point, mobile communication devices, etc.) in network environment 100.

Accordingly, the allocation manager 140 can be configured to receive feedback from the multiple wireless access points 105 and/or mobile communication devices; produce report information based on the feedback; and distribute the updated report information to the multiple wireless access points.

If further desired, the channel allocation manager can be configured to forward the frequency interference report 220 any of one or more communication resources in the network environment 100 for ratification and possible updating so that it is more accurate.

In accordance with further embodiments, as further discussed below, the channel allocation manager 140 and/or any of the communication resources in network environment 100 uses the frequency interference report 220 to schedule use of one or more wireless channels in the network environment 100.

For example, in one embodiment, the frequency interference report 220 can include predictive interference information. The predictive interference information can be used as a basis to identify channels that are expected to experience low interference such as within the next couple to few hundred milliseconds. Such channels are best candidates to allocate for future use. For example, in one embodiment, based on the predictive information into the frequency interference report 220, the channel allocation manager 140 determines which of the wireless channels are the best candidates for subsequent usage in one more future timeframes.

Figure 3:
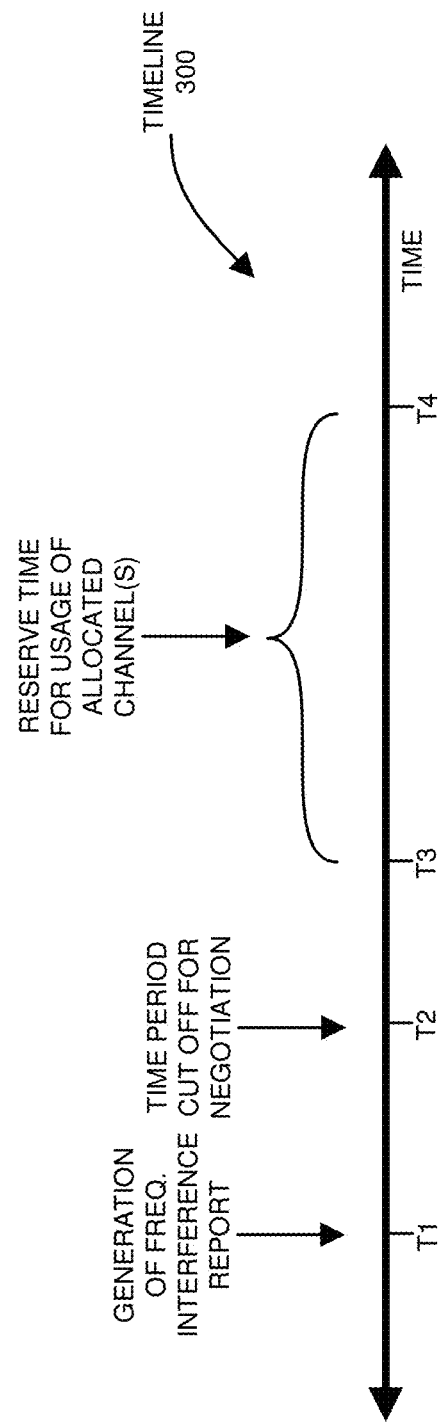
FIG. 3 is an example timeline illustrating different events associated with allocation and use of wireless channels according to embodiments herein.

FIG. 3 is an example timeline of generating and using an interference report according to embodiments herein.

In this example embodiment, as shown in timeline 300, at or around time T1, the channel allocation manager 140 generates the frequency interference report 220. As previously discussed, the frequency interference report 220 can quickly become stale because usage of the different wireless channels changes over time.

In one embodiment, because the report 220 can become stale, the time period cutoff for negotiating allocation of channels based on a snapshot of the report 220 (at or around time T1) is time T2. In other words, to use the report 220 generated at or around time T1, a respective communication resource in network environment 100 must negotiate use of one or more wireless channels prior to time T2.

Assume in this example embodiment that a communication resource negotiates (prior to cut off time T2) with the channel allocation manager 140 to use a group of one or more wireless channels. Negotiations can include the wireless access point 105-1 utilizing the report 220 as a basis in which to determine which of one or more available channels to request for use. The wireless access point 105-1 notifies the channel allocation manager 140 of desired one or more channels and a respective one or more timeframes in which the wireless access point 105-1 would like to use the requested channels.

As discussed herein, the wireless access point 105-1 can be configured to further decide how to use one or more allocated channels.

As further discussed below, assume in this example embodiment that the channel allocation manager 140 confirms and/or allocates use of a group of wireless channels between time T3 and time T4 for use by wireless access point 105-1 or its assigns. In one embodiment, few or none of the other wireless access points in close proximity to wireless access point 105-1 or communication resources uses the group of one or more wireless channels between time T3 and time T4 because they have been assigned for use by a specific communication resource (such as wireless access point 105-1, mobile communication device 120-1, etc.) in network environment 100.

Figure 4:
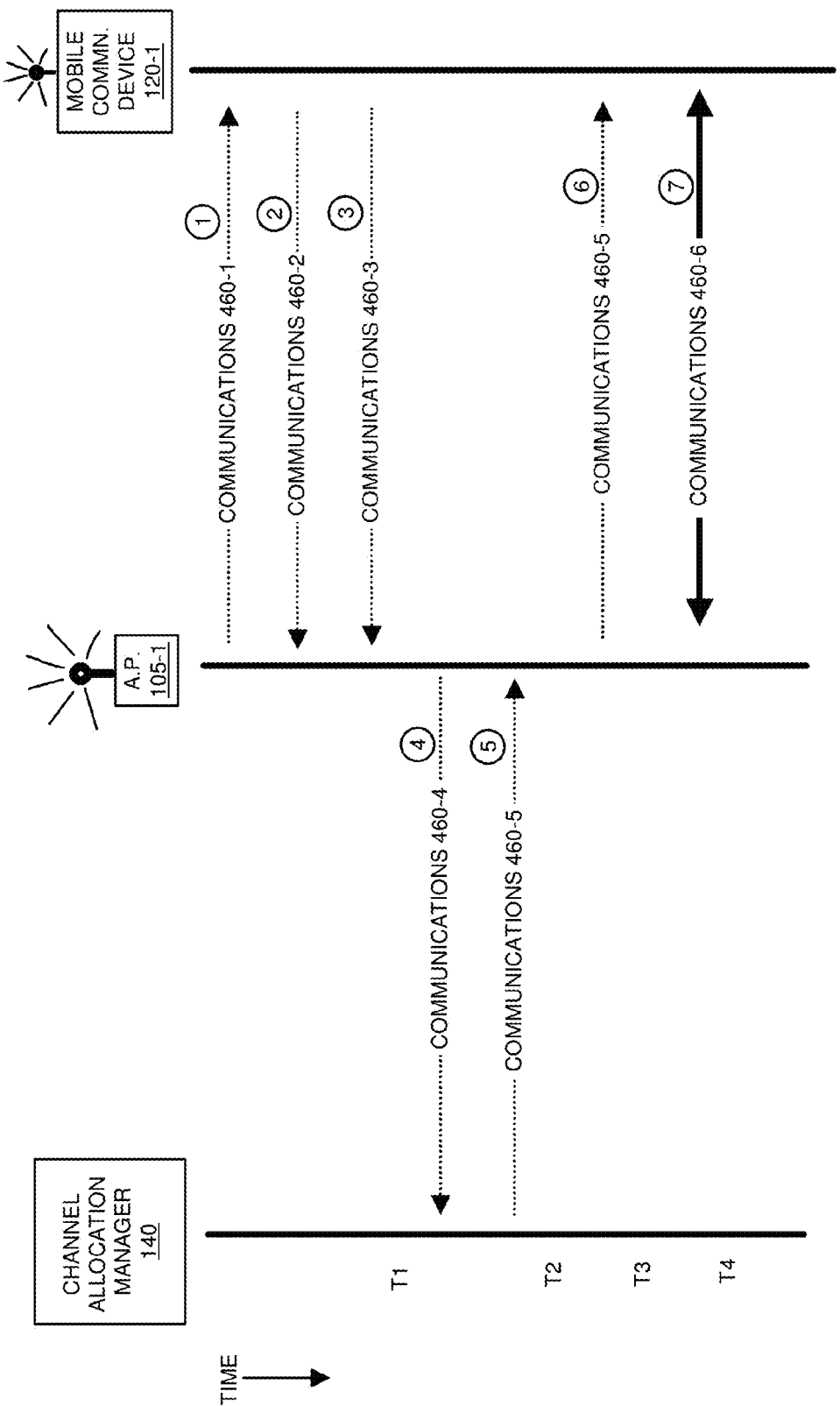
FIG. 4 is an example diagram illustrating communications according to embodiments herein.

FIG. 4 is a further example diagram illustrating communications according to embodiments herein.

In this example embodiment, the wireless access point 105-1 (such as a first station) transmits communications 460-1 to the mobile communication device 120-1 (such as a second station). In one embodiment, the communications 460-1 includes bit information indicating that the wireless access point 105-1 supports one or more of the following communication modes: full-duplex communications, allocation of wireless channels in one more time frames, aggregation of channels for simultaneous use, etc.

Thus, embodiments herein include transmitting a message (such as communications 460-1) from a first station to a second station, the message indicating that the wireless access point supports full-duplex communications, TDMA or scheduled, communications, etc.

By further way of non-limiting example embodiment, the communications 460-1 can be or include a beacon that is broadcasted in the wireless region 115 in accordance with a WiFi™ protocol from the wireless access point 105-1 in wireless region 115-1 to the mobile communication device 120-1. In other words, transmission of communications 460-1 can include broadcasting the communications 460-1 as a beacon in accordance with a WiFi™ protocol from a first communication resource to a second communication resource in network environment 100.

Assume in this example embodiment, that the mobile communication device 120-1 is configured to support full-duplex communications (i.e., simultaneous bi-directional communications between the wireless access point 105-1 and mobile communication device 120-1). In response to receiving the communications 460-1, the mobile communication device 120-1 transmits communications 460-2 (such as an acknowledgment message) to wireless access point 105-1. The acknowledgment message in communications 460-2 indicates that the mobile communication device 120-1 supports full-duplex communications or any other specified communication mode.

Thus, via communications 460-2, the wireless access point 105-1 receives the acknowledgment from the mobile communication device 120-1. As previously discussed, in one embodiment, the acknowledgment indicates that the mobile communication device 120-1 supports full-duplex communications or other communication modes.

Assume further in this example embodiment that the wireless access point 105-1 or the mobile communication device 120-1 would like to be allocated one or more wireless channels to communicate data either i) upstream from the mobile communication device 120-1 to the wireless access point 105-1 or ii) downstream from the wireless access point 105-1 to the mobile communication device 120-1.

In one embodiment, assume that the mobile communication device 120-1 has extra data queued and is unable to transmit at a desired rate in an upstream direction to the wireless access point 105-1 using only CSMA-acquired channels. In response to detecting this condition, the mobile communication device 120-1 forwards a request for additional bandwidth (such as one or more wireless vacation channels) to wireless access point 105-1. As further discussed below, allocation of additional bandwidth will enable the mobile communication device 120-1 to transmit the extra to data upstream to and through the wireless access point 105-1 to network 190.

Via communications 460-4, the wireless access point 105-1 notifies the channel allocation manager 150 that the wireless access point 105-1 and/or mobile communication device 120-1 would like to be allocated use of one or more wireless channels. The wireless access point 105-1 can communicate the request for wireless bandwidth such as one or more wireless channels on behalf of itself or on behalf of the mobile communication device 120-1. In other words, the wireless access point 105-1 can be configured to request allocation of bandwidth in response to detecting a condition in which the wireless access point 105-1 would like to transmit data downstream to the mobile communication device 120-1.

As previously discussed, the channel allocation manager 140 generates report 220 to predict future wireless channel usage in the network environment 100. Based on the report 220, the channel allocation manager 140 (or other suitable resource such as wireless access point 105-1 itself) selects one or more wireless channels use in the network environment 100 that are expected to be free (i.e., relatively isolated from interference) between any suitable timeframe such as between time T3 and T4.

Via communications 460-4 and 460-5, such as negotiations for allocation of one or more channels, assume that the wireless access point 105-1 is allocated one or more channels in the timeframe between time T3 and T4.

In one embodiment, if the mobile communication device 120-1 requests the additional one or more wireless channels for use, the wireless access point 105-1 notifies the mobile communication device 120-1 via communications 460-5 that the one or more wireless channels have been allocated for its use between time T3 and T4. Subsequent to allocation of the one or more channels, via communications 460-6, the mobile communication device 120-1 utilizes the allocated channels to communicate in an upstream direction from mobile communication device 120-1 to the wireless access point 105-1.

Alternatively, note that if the wireless access point 105-1 requested allocation of the additional one or more wireless channels (such as one or more WiFi™ channels) for its own use, the wireless access point 105-1 would utilize the allocated one or more channels to communicate in a downstream direction from the wireless access point 105-1 to the mobile communication device 120-1 during a timeframe such as between time T3 and time T4.

Thus, embodiments herein include communicating between a first station and a second station over one or more wireless channels in a specified timeframe (such as between time T3 in time T4) in accordance with a TDMA (Time Division Multiple Access) communication protocol in lieu of having to acquire the one or more wireless channels using the CSMA communication protocol. As previously discussed, the controller-allocated wireless channels can be used in conjunction with one or more CSMA-acquired channels.

Figure 5:
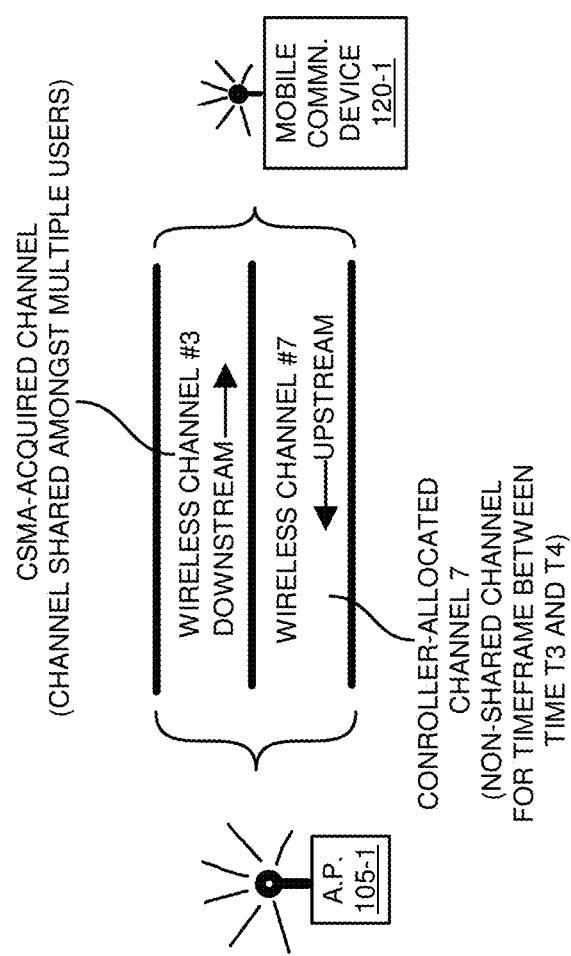
FIG. 5 is an example diagram illustrating use of at least one CSMA-acquired wireless channel and use of one or more time based controller-allocated channels according to embodiments herein.

FIG. 5 is an example embodiment illustrating full-duplex communications according to embodiments herein.

In this example embodiment, assume that the wireless access point 105-1 uses channel #3 (such as a CSMA-acquired channel) to communicate in a downstream direction to the mobile communication device 120-1. The data transmitted in a downstream direction from the wireless access point 105-1 to the mobile communication device 120-1 can be any suitable type of information such as control information, payload data, etc.

As previously discussed, the mobile communication device 120-1 can be configured to request allocation of a wireless channel for usage in the upstream direction. Assume that the channel allocation manager 140 allocates wireless channel #7 for use by wireless access point 105-1. In this example the wireless access point 105-1 communicates in a downstream direction over wireless channel #3, while the mobile communication device 120-1 communicates data in an upstream direction over the controller-allocated wireless channel #7 between at least allocated time T3 and time T4.

Thus, the wireless access point 105-1 and mobile communication device 120-1 can be configured to support full-duplex communications in which the wireless access point 105-1 utilizes the first wireless channel #3 to communicate first data between the wireless access point 105-1 and the mobile communication device 120-1, while the mobile communication device 120-1 utilizes the second wireless channel #7 to communicate second data from the mobile communication device 120-1 to the wireless access point 105-1.

In one embodiment, the wireless access point 105-1 utilizes the wireless channel #3 (such as a primary channel) to convey control information (associated with wireless channel #7) from the wireless access point 105-1 to the mobile communication device 120-1. The control information provides the mobile communication device 120-1 notification of allocation of wireless channel #7 and a corresponding one more time frames in which to transmit data. Thus, the wireless channel #3 and transmission of control information data facilitates conveyance of the data over wireless channel #7 (such as a supplemental allocated wireless channel) from the mobile communication device 120-1 to the wireless access point 105-1.

Note that transmission of data over the wireless channel #3 and wireless channel #7 is shown by way of non-limiting example only. In accordance with another example embodiment, the mobile communication device 120-1 can be configured to acquire wireless channel #3 in accordance with CSMA techniques as previously discussed. After acquiring the wireless channel #3, the mobile communication device 120-1 initiates communication of respective data over wireless channel #3 upstream to wireless access point 105-1. In a similar manner as previously discussed, the wireless access point 105-1 can be configured to request allocation of channel #7 from channel allocation manager 140. Subsequent to allocation of wireless channel #7 to wireless access point 105-1, the wireless access point 105-1 can be configured to transmit data over the wireless channel #7 downstream to mobile communication device 120-1 between time T3 and time T4. Thus, the mobile communication device 120-1 can be configured to communicate over a CSMA-acquired channel in the upstream direction while the wireless access point 105-1 communicates over a controller-allocated wireless channel in a downstream direction to the mobile communication device 120.

In accordance with yet further embodiments, the allocated channel and the CSMA-acquired channel can be used to the transmit data in same direction. For example, in one embodiment, the wireless access point 105-1 can utilize wireless channel #3 to transmit respective data in a downstream direction to mobile communication device 120-1. Upon allocation of wireless channel #7, if desired, the wireless access point 105-1 can additionally transmit data downstream to the mobile communication device 120-1 over allocated wireless channel #7 between time T3 and time T4. Thus, in accordance with embodiments herein, one or more CSMA-acquired channels can be aggregated with one or more wireless channels allocated by the channel allocation manager 140 to communicate data in a downstream direction from the wireless access point 105-1 to the mobile communication device 120-1. The extra bandwidth associated with wireless channel #7 and aggregation of channels in this instance enables the wireless access point 105-1 to more quickly empty a buffer of queued data.

Conversely, in accordance with yet further embodiments, the allocated channel and the CSMA-acquired channel can be used to transmit data in an upstream direction. For example, in one embodiment, the mobile communication device 120-1 can compete (using CSMA) with other communication resources for use of wireless channel #3 to communicate in an upstream direction from the mobile communication device 120-1 to the wireless access point 105-1. The mobile communication device 120-1 can request allocation of additional wireless channels. Upon receiving notification that channel #7 has been allocated for use by the mobile communication device 120-1, in addition to competing for use of and communicating upstream using wireless channel #3, the mobile communication device additionally can use allocated wireless channel #7 to communicate data in an upstream direction from the mobile communication device 120-1 to the wireless access point 105-1. Thus, in accordance with embodiments herein, one or more CSMA-acquired channels can be aggregated with one or more channels allocated by the channel allocation manager 140 to communicate data in an upstream direction from the mobile communication device 120-1 to the wireless access point 105-1.

In accordance with further embodiments, the channel allocation manager 140 selects the controller-allocated channel 7 from a pool of channels that are set aside for allocation to support scheduled TDMA-type communications. Depending on use, the amount of wireless channels in the pool can change over time. Subsequent to a communication resource such as wireless access point 105-1 or mobile communication device 120-1 utilizing the allocated wireless channel #7 to transmit data in a pre-specified timeframe such as between time T3 and T4 in accordance with a TDMA communication protocol, the channel allocation manager 140 places the wireless channel #7 back into the pool and then re-allocates the particular wireless channel #7 for use by another wireless access point, mobile communication device, etc., in a subsequent one or more time frames. Accordingly, the same wireless channel #7 can be used at different times by different communication resources.

If desired, subsequent to the first wireless access point 105-1 transmitting data over the particular wireless channel in the pre-specified timeframe between time T3 and time T4 in accordance with TDMA-type communications, the channel allocation manager 140 can be configured to submit the particular wireless channel #7 to a pool of wireless channels acquirable in the network environment via CSMA communications. Accordingly, wireless channel #7 need not be dedicated as merely a controller-allocated channel all of the time. Instead, at certain times, wireless channel #7 can be allocated for use by the channel allocation manager 140; at other times, the channel allocation manager 140 can dedicate wireless channel #7 as a channel that is acquirable by the communication resources in accordance with CSMA communications. This flexibility provides more efficient use of the wireless channel #7.

Figure 6:
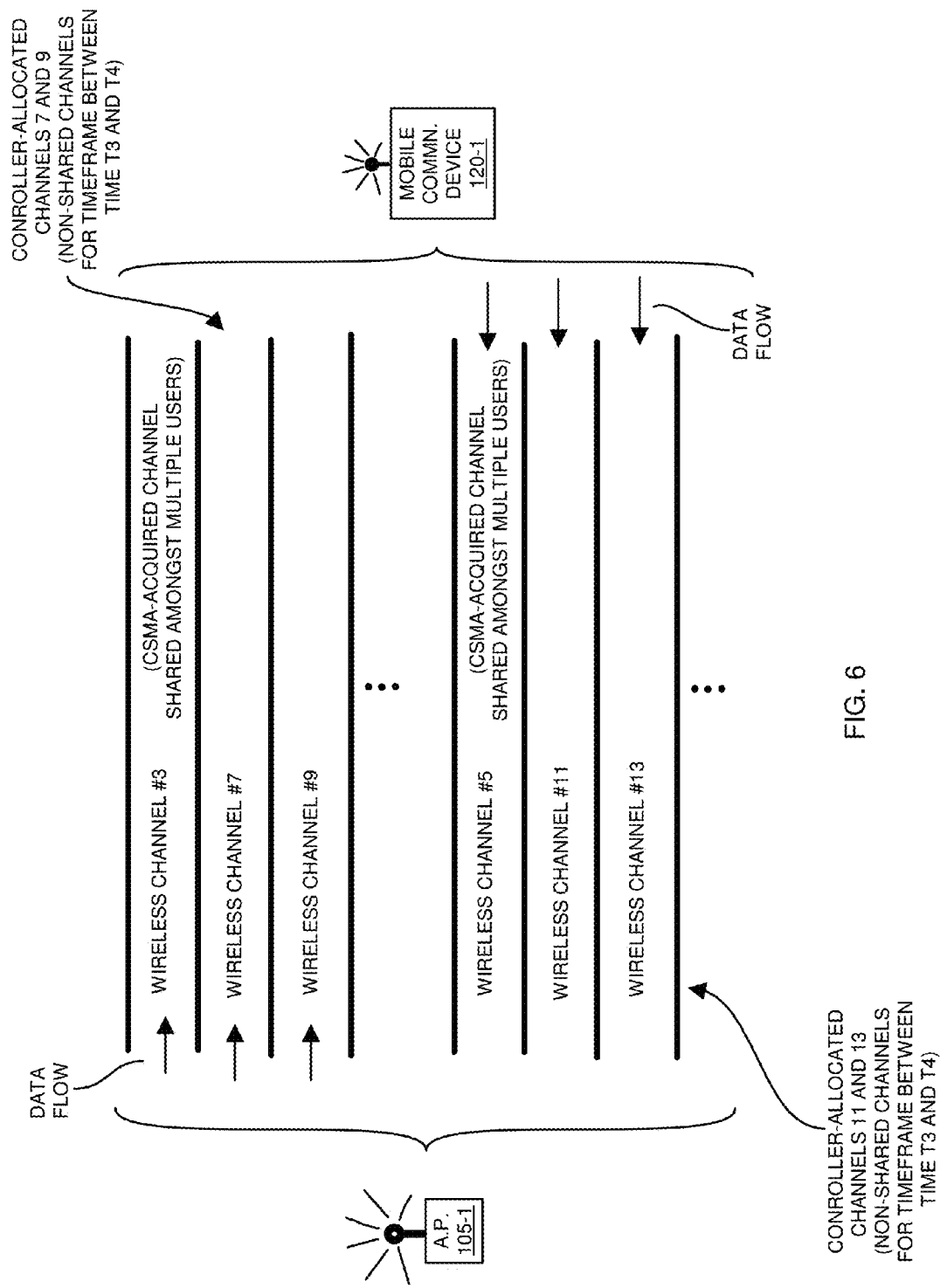
FIG. 6 is an example diagram illustrating use and aggregation of one or more CMSA acquired wireless channels and one or more controller allocated channels according to embodiments herein.

FIG. 6 is an example diagram illustrating aggregation of channels according to embodiments herein. In this example embodiment, each of the communication resources in network environment 100 is able to aggregate channels to communicate data to a target communication resource. In one embodiment, the aggregate channels can be used to communicate and a half duplex mode or a full-duplex mode.

For example, in a downstream direction from the wireless access point 105-1 to mobile communication device 120-1, the wireless access point 105-1 is able to compete with other communication resources to acquire one or more available wireless channels using CSMA as previously discussed. Additionally, in a manner as previously discussed, the wireless access point 105-1 is able to request one or more wireless channels from channel access manager 140. In appropriate one or more specified time frames, these additional one or more controller-acquired, scheduled-usage channels can be aggregated with the CSMA-acquired channels to communicate in a downstream direction from the wireless access point 105-1 to the mobile communication device 120-1.

In this example embodiment, assume that the wireless access point 105-1 uses CSMA-acquired channel #3 to communicate in a downstream direction to the mobile communication device 120-1. Additionally, wireless access point 105-1 communicates with channel allocation manager 140 to obtain one or more non-CSMA acquired wireless channels #7 and #9 (i.e., TDMA scheduled usage channels). In addition to using wireless channel #3, the wireless access point 105-1 uses wireless channels #7 and #9 to communicate data downstream to communication device 120-1.

In an upstream direction from the mobile communication device 120-1 to the wireless access point 105-1, the mobile communication device 120-1 is able to compete with other communication resources to acquire one or more available wireless channels using CSMA as previously discussed. Additionally, in a manner as previously discussed, mobile communication device 120-1 is able to request one or more wireless channels from channel access manager 140. In appropriate one or more pre-specified time frames, these additional one or more controller-acquired channels can be aggregated with the CSMA-acquired channels to communicate in an upstream direction from the mobile communication device 120-1 to the wireless access point 105-1.

In this example embodiment, assume that the mobile communication device 120-1 uses CSMA-acquired channel #5 to communicate in an upstream direction to the wireless access point 105-1. Additionally, mobile communication device 120-1 receives allocation of controller-allocated wireless channels #11 and #13 from channel allocation manager 140. In addition to using wireless channel #5, the mobile communication device 120-1 uses wireless channels #11 and #13 (i.e., TDMA scheduled usage channels) to communicate data downstream to communication device 120-1.

Thus, a first set of one or more CSMA-acquired channels and one or more controller-allocated wireless channels can be used to communicate in a downstream direction at the same time that the second set of one or more CSMA-acquired channels and one or more controller-allocated wireless channels is used to communicate an upstream direction.

To help eliminate cross interference between consecutive (i.e., side-by-side) channels in the wireless spectrum, note that the wireless channel #7 can be spaced apart from wireless channel #9 by another available wireless channel such as channel #8. Additionally, wireless channel #11 can be spaced apart from wireless channel #13 by another channel such as channel #10.

Figure 7:
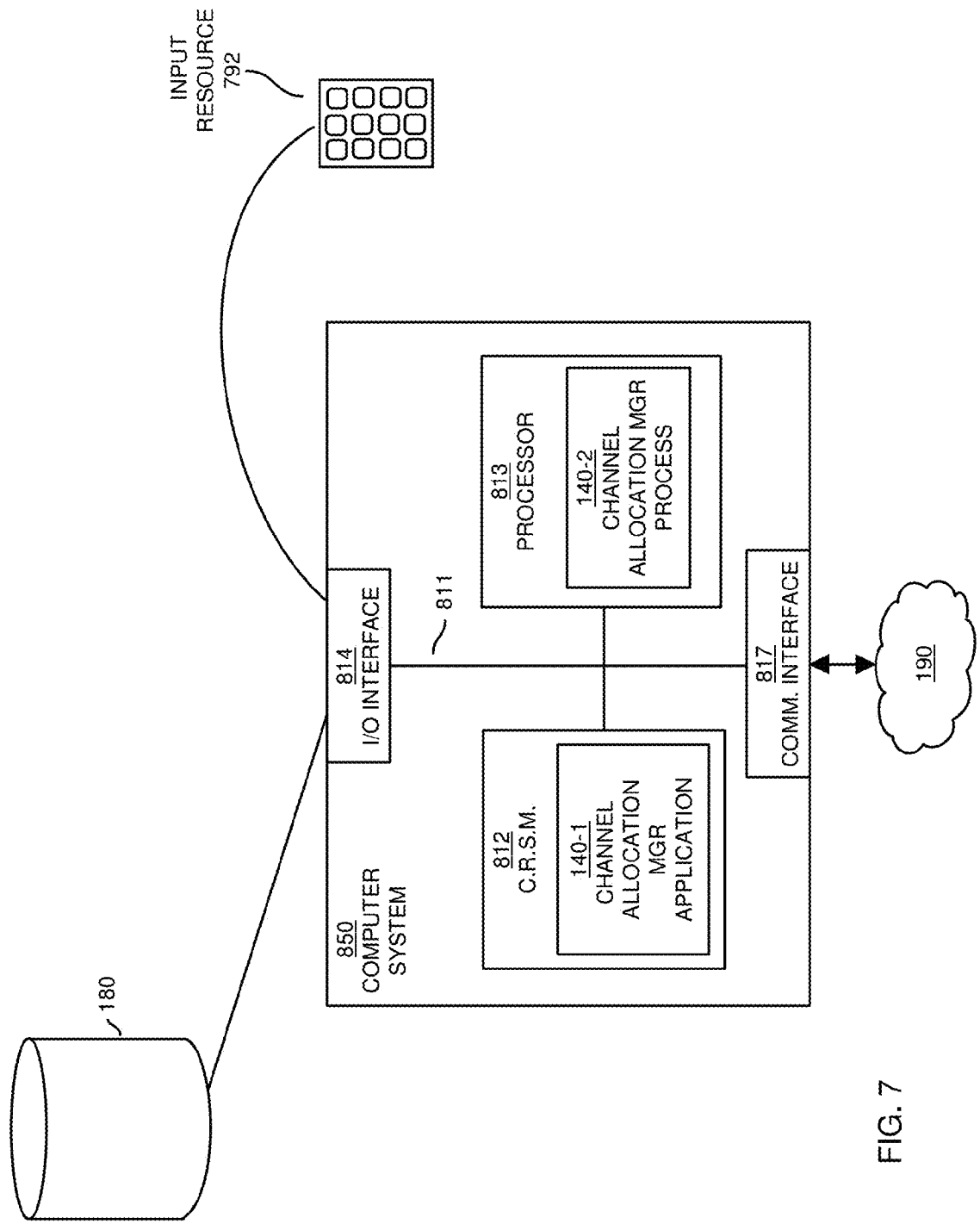
FIG. 7 is a diagram illustrating an example computer architecture in which to execute any functionality according to embodiments herein.

FIG. 7 is an example block diagram of a computer device for implementing any of the operations as discussed herein according to embodiments herein.

In one embodiment, one or more computers execute controller 150 and/or the channel allocation manager 140 as discussed herein.

As shown, computer system 850 (such as one or more computers) of the present example includes an interconnect 811, a processor 813 (such as one or more processor devices, computer processor hardware, etc.), computer readable storage medium 812 (such as hardware storage to store instructions, data, information, etc.), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resource 792, a computer mouse, etc.

Computer readable storage medium 812 (such as a non-transitory hardware medium) can be any suitable hardware storage resource or device such as memory, optical storage, hard drive, rotating disk, etc. In one embodiment, the computer readable storage medium 812 stores instructions associated with channel allocation manager application 140-1. Processor 813 (computer processor hardware) executes these instructions.

Communications interface 817 enables the computer system 850 and processor 813 to communicate over a resource such as network 190 to retrieve information from remote sources and communicate with other computers. I/O interface 814 enables processor 813 executing channel allocation manager application 140-1 to retrieve stored information such as from repository 180.

As shown, and as previously discussed, computer readable storage media 812 is encoded with the channel allocation manager application 140-1 (e.g., software, firmware, etc.) executed by processor 813 (hardware). Channel allocation manager application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in the channel allocation manager application 140-1 stored on computer readable storage medium 812.

Execution of the channel allocation manager application 140-1 produces processing functionality such as channel allocation manager process 140-2 in processor 813. In other words, the channel allocation manager process 140-2 associated with processor 813 represents one or more aspects of executing channel allocation manager application 140-1 within or upon the processor 813 in the computer system 850.

Those skilled in the art will understand that the computer system 850 can include other processes and/or software and hardware components, such as an operating system that controls allocation and use of hardware resources to execute channel allocation manager application 140-1.

In accordance with different embodiments, note that computer system may be any of various types of devices, including, but not limited to, a controller, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 and its parts may reside at any of one or more locations or can be included in any suitable one or more resource in network environment 100 to implement functionality as discussed herein.

Functionality supported by the different resources will now be discussed via flowcharts in FIGS. 8, 9, and 10. Note that the steps in the flowcharts below can be executed in any suitable order.

Figure 8:
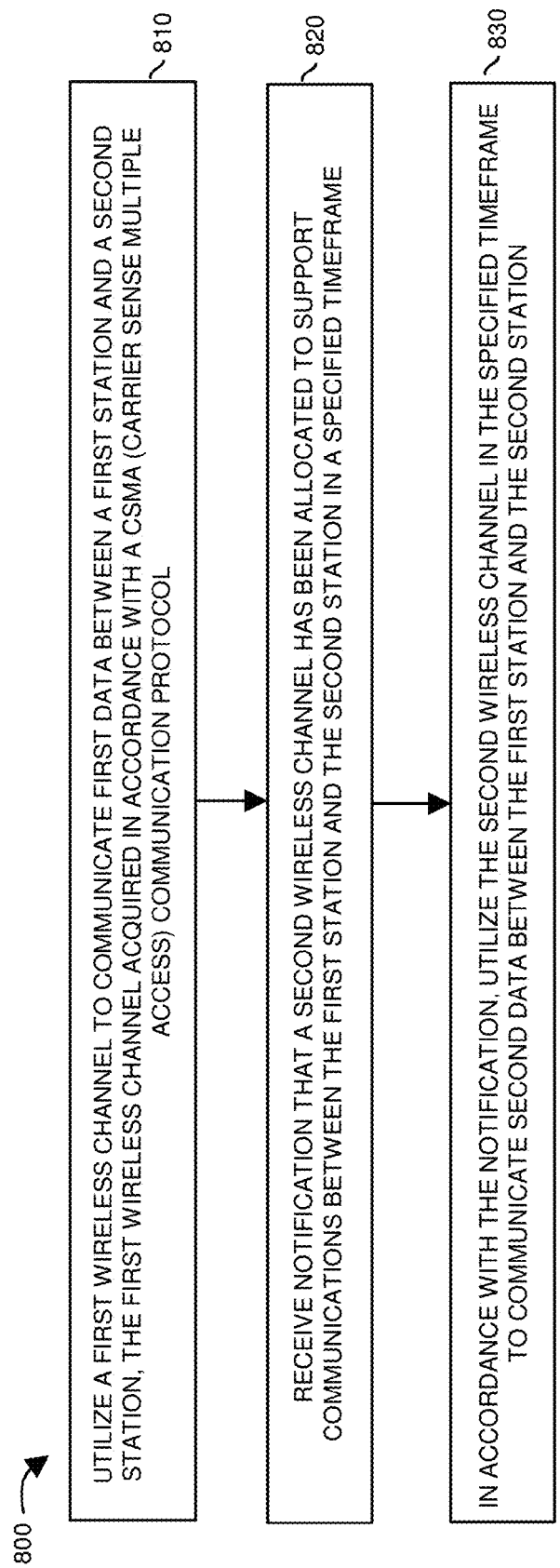
FIGS. 8, 9, and 10 are example diagrams illustrating methods according to embodiments herein.

FIG. 8 is a flowchart 800 illustrating an example method according to embodiments. Note that there will be some overlap with respect to concepts as discussed above.

In processing block 810, a first wireless channel is used to communicate first data between a first station (such as wireless access point 105-1) and a second station (such as mobile communication device 120-1). Assume in this example that the first wireless channel is acquired in accordance with a CSMA-type communication protocol as previously discussed.

In processing block 820, the first station (such as wireless access point 105-1) receives notification from channel allocation manager 140 that a second wireless channel has been allocated to support communications between the first station and the second station in a specified timeframe.

In processing block 830, in accordance with the notification, the second wireless channel is used in the specified one or more timeframes to communicate second data between the first station and the second station. As previously discussed, the second wireless channel can be used to communicate data in any suitable direction. For example, if desired, the wireless access point 105-1 can be configured to use the second wireless channel to communicate data from the wireless access point 105-1 to the mobile communication device 120-1. Alternatively, the wireless access point 105-1 can notify the mobile communication device 120-1 that the second wireless channel has been allocated for use in the specified timeframe. In such an instance, the mobile communication device 120-1 communicates data over the second wireless channel to the wireless access point 105-1 in the specified timeframe.

Figure 9:
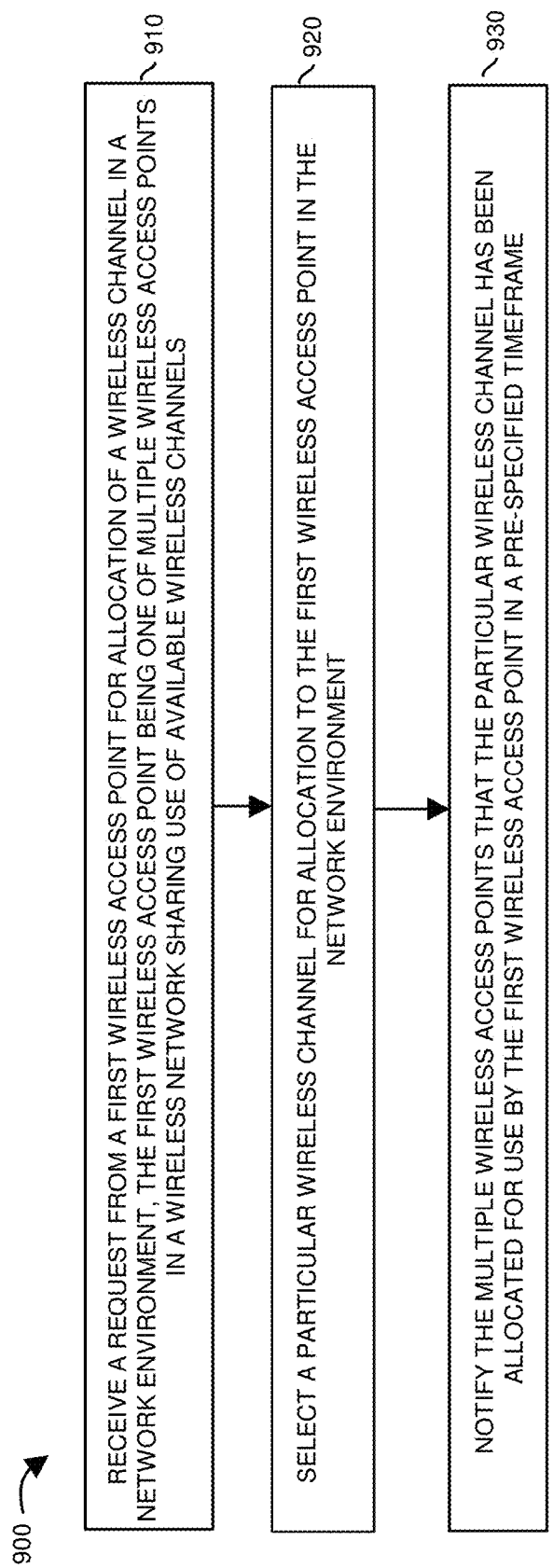

FIG. 9 is a flowchart 900 illustrating an example method according to embodiments. Note that there will be some overlap with respect to concepts as discussed above.

In processing block 910, the channel allocation manager 140 receives a request from the station such as a wireless access point 105-1 for allocation of a wireless channel in network environment 100. The wireless access point 105-1 is one of multiple wireless access points 105 in a respective wireless network sharing use of available wireless channels.

In processing block 920, the channel allocation manager 140 selects a particular wireless channel for allocation to the wireless access point 105-1 in the network environment 100. In one embodiment, as previously discussed, the channel allocation manager 140 allocates a channel that is expected to be relatively free from use by other communication resources in the network environment 100 during a specified one or more timeframes.

In processing block 930, the channel allocation manager 140 notifies the multiple wireless access points 105 that the particular wireless channel has been allocated for use by the wireless access point 105-1 in the predetermined one or more timeframes.

Figure 10:
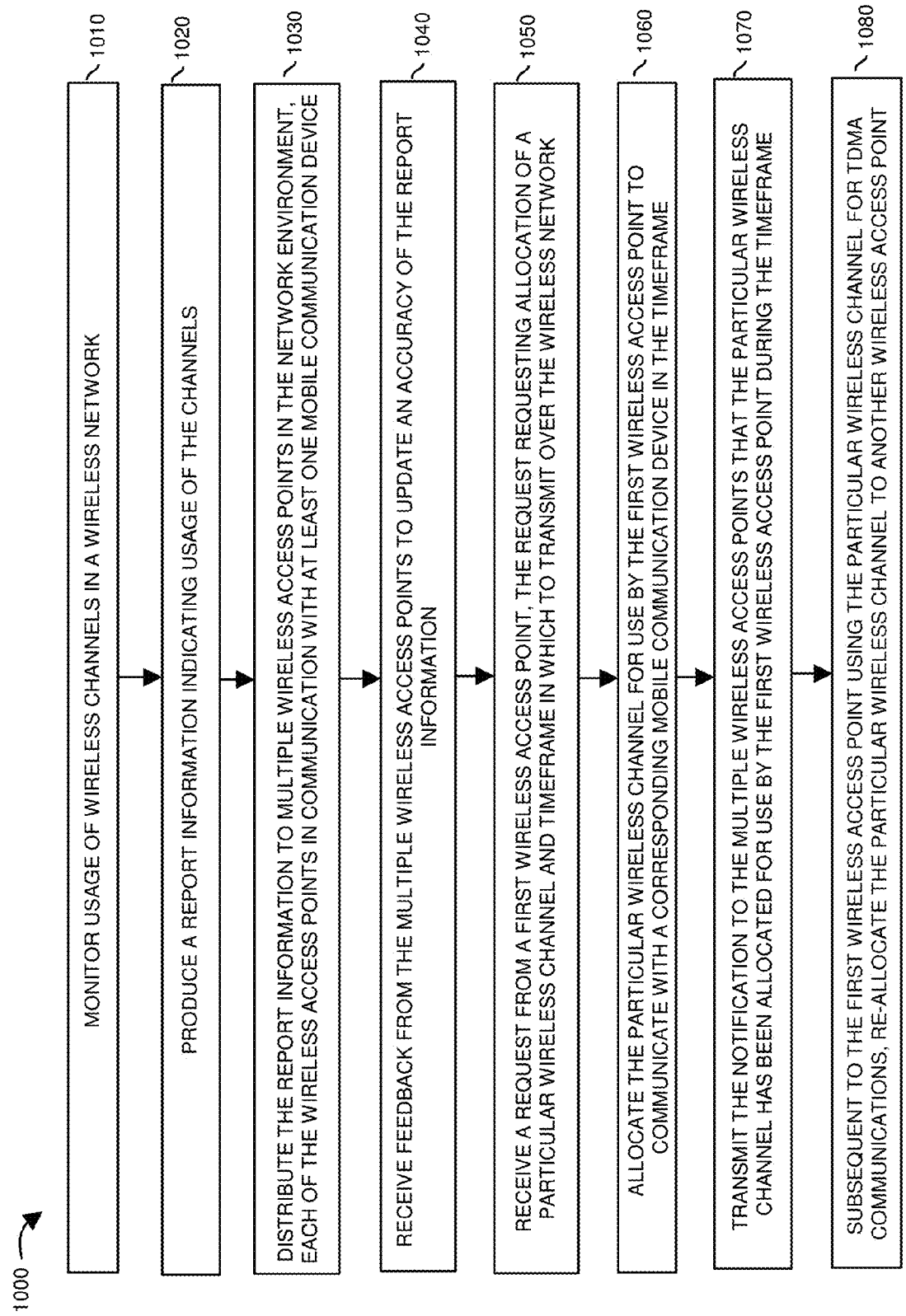

FIG. 10 is a flowchart 1000 illustrating an example method according to embodiments. Note that there will be some overlap with respect to concepts as discussed above.

In processing block 1010, the channel allocation manager 140 monitors usage of wireless channels in a wireless network environment 100. As previously discussed, this can include receiving feedback from any of the communication resources in the network environment 100. In one embodiment, the feedback indicates channel usage/interference.

In processing block 1020, based on monitoring parameters associated with the shared wireless channels in network environment 100, the channel allocation manager 140 produces report information (such as frequency interference report 220) indicating usage/interference associated with available channels.

In processing block 1030, the channel allocation manager 140 distributes the report information to multiple wireless access points 105 in the network environment 100. In one embodiment, the wireless access points 105 receiving the report information ratify the report information.

In processing block 1040, the channel allocation manager 140 receives further feedback such as ratification of the report information from the multiple wireless access points 105 and/or mobile communication devices.

In processing block 1050, the channel allocation manager 140 receives a request from wireless access point 105-1. The request indicates that the wireless access point 105-1 would like to be granted allocation of bandwidth such as a particular wireless channel and corresponding one more time frames in which to transmit data over the wireless network. As previously discussed, the wireless access point 105-1 may request allocation of a channel for itself or it may request allocation of a channel on behalf of a respective mobile communication device such as mobile communication device 120-1. The wireless access point may specify a particular channel that it would like to use for TDMA-type communications. Alternatively, the wireless access point may rely on the channel allocation manager 140 to select an appropriate one or more time slotted channels.

In processing block 1060, the channel allocation manager 140 allocates a particular wireless channel for use by the wireless access point 105-1 and/or mobile communication device 120-1.

In processing block 1070, the channel allocation manager 140 transmits the notification to one or more of the multiple wireless access points 105 that the particular (allocated) wireless channel has been allocated for use by the first wireless access point and/or mobile communication device 120-1 during the selected one or more timeframes. As previously discussed, the wireless access point 105-1 can use the allocated wireless channel in any suitable manner. For example, the wireless access point 105-1 can use the allocated channel during the specified one or more timeframe to communicate data from the wireless access point 105-1 to the mobile communication device 120-1. Additionally or alternatively, the wireless access point 105-1 can be configured to notify the mobile communication device 120-1 that the allocated wireless channel is available for use by the mobile communication device 120-1 in the one or more controller-specified timeframes.

In processing block 1080, subsequent to the first wireless access point 105-1 using the particular wireless channel for TDMA-type communications in the specified one or more timeframes, the channel allocation manager 140 re-allocates the particular wireless channel to another wireless access point and/or mobile communication device during one or more subsequent timeframes. As previously discussed, the allocated wireless channel can be a supplemental channel with respect to one or more CSMA acquired channels.

Accordingly, embodiments herein include unique ways of aggregating channels for providing full duplex and half duplex communications with respect to conventional techniques.

Note again that techniques herein are well suited to provide a way of allocating wireless channels in a wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While one or more inventions have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving a request from a first wireless access point for allocation of a wireless channel in a network environment, the first wireless access point being one of multiple wireless access points in a wireless network sharing use of multiple wireless channels;
   in response to the request, selecting a first wireless channel amongst the multiple wireless channels for allocation in the wireless network, the first wireless channel being supplemental with respect to a second wireless channel allocated to support communications between the first wireless access point and a mobile communication device, the first wireless channel and the second wireless channel allocated for simultaneous use between the first wireless access point and the mobile communication device; and
   communicating a notification to the first wireless access point, the notification indicating that the first wireless channel has been allocated for use in a specified timeframe;
   the method further comprising: subsequent to the first wireless access point transmitting data over the first wireless channel in the specified timeframe in accordance with a TDMA protocol, submitting the first wireless channel to a pool in which the first wireless channel is acquirable for use in the network environment via CSMA (Carrier Sense Multiple Access) communications.

2. The method as in claim 1 further comprising:
   monitoring usage of the multiple wireless channels in the wireless network prior to allocation of the first wireless channel to the first wireless access point;

producing report information indicating predicted interference associated with the multiple wireless channels; and distributing the report information to the multiple wireless access points in the wireless network, each of the multiple wireless access points in communication with at least one mobile communication device;

receiving ratification of the report information; and utilizing the ratified report information to select the first wireless channel for allocation to the first wireless access point.

3. The method as in claim 1, wherein the first wireless access point simultaneously utilizes the first wireless channel and the second wireless channel during the time slot as specified by the notification to support full-duplex communications between the first wireless access point and the mobile communication device in the wireless network.

4. The method as in claim 1, wherein the first wireless access point simultaneously communicates first data over the first wireless channel to the mobile communication device when the mobile communication device communicates second data over the second wireless channel to the first wireless access point in the specified timeframe.

5. The method as in claim 1, wherein the request received from the first wireless access point indicates the specified timeframe.

6. The method as in claim 1 further comprising:

communicating a message to a second wireless access point indicating that the first wireless channel is unavailable for use in the specified timeframe.

7. The method as in claim 1, wherein the first wireless channel is allocated to support first communications from the mobile communication device to the first wireless access point; and wherein the second wireless channel is allocated to support second communications from the first wireless access point to the mobile communication device.

8. The method as in claim 7, wherein the first wireless channel is allocated in accordance with TDMA (Time Division Multiple Access); and wherein the second wireless channel is allocated in accordance with CSMA (Carrier Sense Multiple Access).

9. The method as in claim 8, wherein the first wireless channel and the second wireless channel support full-duplex communications.

10. The method as in claim 1, wherein the first wireless channel is allocated in accordance with TDMA (Time Division Multiple Access) from a controller in communication with the first wireless access point; and wherein the first wireless access point is operable to monitor availability of the second wireless channel in accordance with CSMA (Carrier Sense Multiple Access) to obtain use of the second wireless channel.

11. A system comprising:

a controller;

multiple wireless access points including a first wireless access point and a second wireless access point; and the controller operable to:

receive a request from the first wireless access point for allocation of a wireless channel in a network environment, the multiple wireless access points sharing use of multiple wireless channels;

select a first wireless channel amongst the multiple wireless channels for allocation, the first wireless channel being a supplemental channel with respect to a second wireless channel already allocated to support communications between the first wireless access point and a mobile communication device; and communicate a notification to the first wireless access point, the notification indicating that the first wireless channel has been allocated for use in a specified timeframe; and wherein the controller is further operable to:

subsequent to the first wireless access point transmitting data over the first wireless channel in the specified timeframe in accordance with a TDMA protocol, submit the first wireless channel to a pool in which the first wireless channel is acquirable in the network environment via CSMA (Carrier Sense Multiple Access) communications.

12. The system as in claim 11, wherein the controller is further operable to:

monitor usage of the multiple wireless channels in the wireless network prior to allocation of the first wireless channel to the first wireless access point;

produce report information indicating predicted interference associated with the multiple wireless channels;

distribute the report information to the multiple wireless access points in the wireless network, each of the multiple wireless access points in communication with at least one mobile communication device;

receive ratification of the report information; and utilize the ratified report information to select the first wireless channel for allocation to the first wireless access point.

13. The system as in claim 11, wherein the first wireless access point is operable to utilize the first wireless channel in combination with a second wireless channel during the time slot as specified by the notification to support full-duplex communications between the first wireless access point and a respective mobile communication device in the wireless network.

14. The system as in claim 11, wherein the first wireless access point simultaneously communicates first data over the first wireless channel to the mobile communication device when the mobile communication device communicates second data over the second wireless channel to the first wireless access point in the specified timeframe.

15. The system as in claim 11, wherein the request received from the first wireless access point indicates the specified timeframe.

16. The system as in claim 11, wherein the controller is further operable to:

communicate a message to a second wireless access point indicating that the first wireless channel is unavailable for use in the specified timeframe.

17. A method comprising:

monitoring usage of wireless channels in a wireless network;

producing report information indicating usage of the wireless channels;

distributing the report information to multiple wireless access points in the network environment, each of the wireless access points in communication with at least one mobile communication device;

receiving feedback from the multiple wireless access points to update an accuracy of the report information;

receiving a request from a first wireless access point, the request requesting allocation of a first wireless channel and timeframe in which to transmit over the wireless network;

allocating the first wireless channel for use by the first wireless access point to communicate with a corresponding mobile communication device in the timeframe, the first wireless channel being a supplemental channel with respect to a second wireless channel, the first wireless channel and the second wireless channel simultaneously allocated to support communications between the first wireless access point and the corresponding mobile communication device;

transmitting a notification to the multiple wireless access points, the notification indicating that the first wireless channel has been allocated for use by the first wireless access point during the timeframe; and subsequent to the first wireless access point using the first wireless channel for non-CSMA (Carrier Sense Multiple Access) communications, re-allocating the first wireless channel to another wireless access point after the timeframe.

18. Computer-readable storage hardware having instructions stored thereon, the instructions, when carried out by computer processor hardware, cause the computer processor hardware to:

receive a request from a first wireless access point for allocation of a wireless channel in a network environment, the first wireless access point being one of multiple wireless access points in a wireless network sharing use of multiple wireless channels;

select a first wireless channel amongst the multiple wireless channels for allocation, the first wireless channel being a supplemental channel with respect to a second wireless channel currently allocated to support communications between the first wireless access point and a mobile communication device;

notify the first wireless access point that the first wireless channel has been allocated for use in a specified timeframe; and subsequent to the first wireless access point transmitting data over the first wireless channel in the specified timeframe in accordance with a TDMA protocol, submitting the first wireless channel to a pool in which the first wireless channel is acquirable for use in the network environment via CSMA (Carrier Sense Multiple Access) communications.

* * * * *